May 20, 1952     J. W. GRAY     2,597,315
COMPUTER FOR SOLVING RIGHT TRIANGLES
Filed Nov. 6, 1945
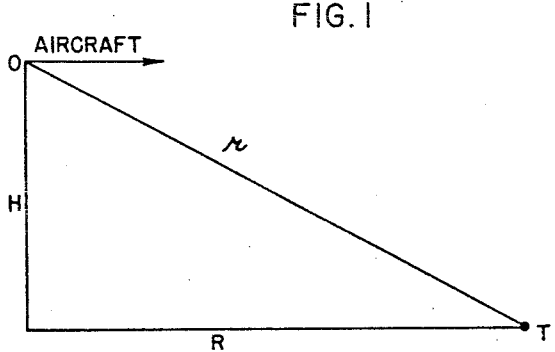
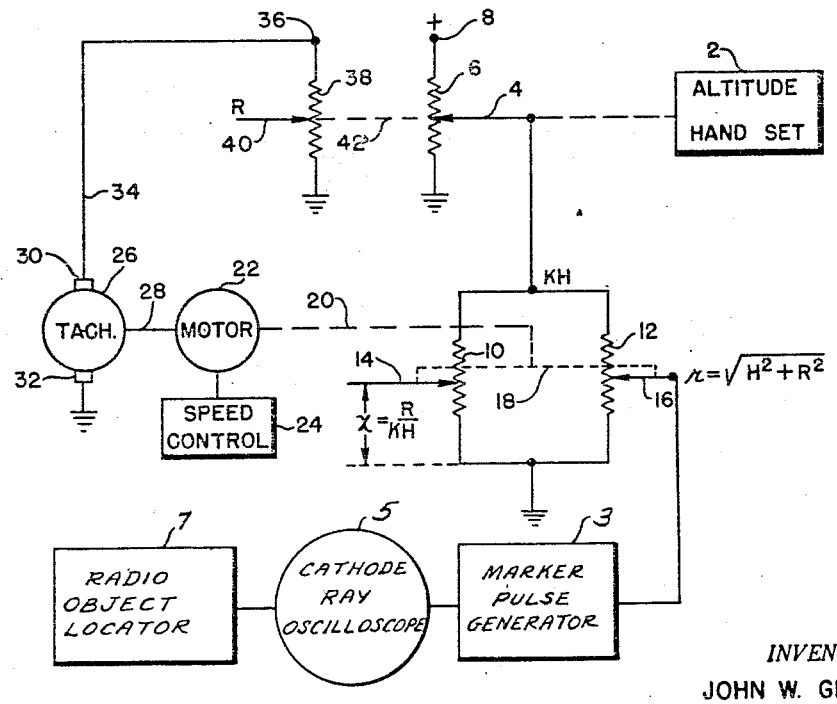
INVENTOR.
JOHN W. GRAY
BY
William D. Hall
ATTORNEY Patented May 20, 1952

2,597,315

UNITED STATES PATENT OFFICE 2,597,315

COMPUTER FOR SOLVING RIGHT TRIANGLES

John W. Gray, Cambridge, Mass., assignor, by mesne assignments, to the United States of America as represented by the Secretary of War Application November 6, 1945, Serial No. 627,045

10 Claims. (Cl. 235—61.5)

The present invention relates to an automatic computer, and it relates more particularly to an electrical computer adapted to solve right triangles.

It is often necessary to solve right triangles in an electrical manner whereby data may be applied to a computer circuit, and a solution of the triangle may be obtained as a voltage. One particular application of such a computer is in an aircraft bombing system. In bombing a ground target from an aircraft, there are many variables to be considered. Three variables which vectorally combine to produce a right triangle are height of the aircraft (H), slant range ($r$) and ground range (R).

Certain bombing systems employ radio object locating apparatus where the position of the target relative to the bombing aircraft is shown on an oscilloscope. In general, the target to be bombed appears as a bright spot of light on the oscilloscope screen at a certain distance from a point on the oscilloscope screen representing the position of the aircraft. This distance is proportional to the slant range ($r$) of the bombing aircraft from the target. In order to actuate the bombsight system associated with the radio object locating apparatus, it is necessary to apply to the bombsight information relating to slant range ($r$) of the target, the ground range (R) of the target, and the rate of change of ground range (ground speed). This information may be of an electrical character and may be in the form of voltages.

It is therefore an object of the present invention to provide an automatic computer which provides a voltage proportional to the slant range ($r$) of an aircraft to a target.

It is another object of the present invention to provide an automatic computer that provides a voltage proportional to the ground range (R) of the target.

It is still another object of the present invention to provide an automatic computer that provides a voltage proportional to the rate of change of ground range.

The invention, however, will be more fully understood from the following detailed description taken into consideration with the accompanying drawing, wherein:

Fig. 1 illustrates the geometry of the problem; and

Fig. 2 is one embodiment of the computer circuit.

Referring now to Fig. 1, H represents the height of the aircraft above the ground, point O represents the position of the aircraft, point T represents the target to be bombed, R represents the ground range from the aircraft to the target, and $r$ represents the slant range from the aircraft to the target. It is apparent from the figure that the triangle there shown is a right triangle.

Fig. 2 is a schematic circuit diagram of one embodiment of the present invention. Altitude hand set 2 is coupled with altitude determining means (not shown) present in the aircraft. It is well known that there are numerous ways of determining the altitude of an aircraft and hence the altimeter means is not shown or described. Altitude hand set 2 consists of a mechanical element whose position at any instance is proportional to the height of the aircraft above ground. This is coupled mechanically to movable arm 4 of potentiometer 6, said potentiometer being connected between a source of positive potential 8 and ground. As movable arm 4 of potentiometer 6 is coupled to altitude hand set 2, the position of said movable arm is a function of the altitude such that the voltage developed at said arm is proportional to the altitude of the aircraft. This may be considered as being proportional to H volts, or equal to KH volts, where K is an unknown constant that need not be known for successful operation, as will be shown by the following discussion.

The voltage between potentiometer arm 4 and ground is impressed across potentiometer 10 and potentiometer 12, said potentiometers being connected in parallel. Potentiometer 10 has a linear characteristic whereas potentiometer 12 has a hyperbolic characteristic; that is, the voltage developed at movable arm 14 of potentiometer 10 is a linear function of the displacement of said movable arm whereas the voltage developed at arm 16 of potentiometer 12 is a hyperbolic function of the displacement of said arm. Potentiometer 12 may be specially wound to provide the hyperbolic characteristic or if desired it may be a linear potentiometer driven by a cam having a hyperbolic characteristic.

Potentiometer arms 14 and 16 are mechanically connected by means of shaft 18. This shaft is in turn mechanically linked by means of mechanical connection 20 to motor 22, said motor having speed control 24.

It can be seen from Fig. 1 that $$r=\sqrt{H^2+R^2}$$

For any predetermined value of H, it can be seen that the above expression is a hyperbolic function. In other words, for a predetermined altitude, the slant range ($r$) from the aircraft to the target varies hyperbolically as the aircraft approaches the target. It can likewise be seen from Fig. 1 that as the aircraft approaches the target, the ground range (R) varies linearly. Therefore, in Fig. 2, the voltage developed at movable arm 16 of hyperbolic potentiometer 12 can be made proportional to the slant range (r), as will be disclosed. In a similar manner it is evident that the voltage derived at movable arm 14 of linear potentiometer 10 can be made proportional to ground range (R), as will be disclosed.

In operation, the target to be bombed appears as a bright spot on the screen of cathode ray oscilloscope 5, which is mounted in the aircraft, and which forms a component of radio object locator 7. The voltage from arm 16 of hyperbolic potentiometer 12 is used to control the position of a marker signal which also appears on the oscilloscope screen. The marker signal is generated in marker generator 3 and is coupled to arm 16 of potentiometer 12, its output being applied to the oscilloscope in any usual manner, the voltage from arm 16 being utilized, as mentioned, merely to control the position of said marker signal on the oscilloscope screen.

In operation, speed control 24 which controls the speed of rotation of motor 22 and which may comprise a rheostat in series with the field of said motor, or any other means for varying motor speed, such means being well known in the art, is adjusted so that the marker signal applied to the heretofore mentioned oscilloscope is always superimposed on the target (corresponding to point T, Fig. 1) which appears on said oscilloscope. In other words, the speed of the motor is such that potentiometer arm 16 linked thereto moves at a rate whereby the voltage developed at said arm is always proportional to the slant range (r) of the target. Thus, the marker signal "tracks" the target.

As potentiometer arm 16 is also coupled to arm 14 of linear potentiometer 10, arm 14 likewise moves, and the displacement ($x$) thereof is a function of the ground range (R). However, as the voltage impressed across potentiometer 10 is proportional to the altitude H, the displacement ($x$) is also a function of H and $$x = \frac{R}{KH}$$

It is evident that as the displacement $$x = \frac{R}{KH}$$

and as the total voltage across the potentiometer is equal to KH volts, then the voltage at movable arm 14 of potentiometer 10 is proportional to the ground range (R).

One of the objects of the present invention is to obtain a voltage proportional to the rate of change of ground range (R) (i. e., the ground speed). This may be accomplished as follows: As the displacement ($x$) of movable arm 14 is always proportional to $$\frac{R}{H}$$

and as said movable arm is driven by motor 22, it is apparent that the speed of motor 22 is proportional to the rate of change of $$\frac{R}{H}$$

The expression for rate of change of $$\frac{R}{H}$$

may be expressed mathematically as $$\frac{\dot{R}}{H}$$

The speed of motor 22 which is proportional to $$\frac{\dot{R}}{H}$$

may be converted into a voltage proportional to $$\frac{\dot{R}}{H}$$

by means of tachometer 26. In the present embodiment, tachometer 26 may consist of a small D. C. generator whose rotor is driven by shaft 28 coupled to the rotor of motor 22. As tachometer 26 operates over a linear portion of its characteristic, the voltage generated across output terminals 30 and 32 is proportional to the speed of motor 22 and hence is proportional to $$\frac{\dot{R}}{H}$$

As the actual voltage developed across terminals 30 and 32 is in terms of the altitude (KH), this voltage must be multiplied by the altitude (KH) in order to obtain the desired voltage which is proportional to $\dot{R}$. As the voltages in the present circuit are with respect to ground, terminal 32 may be grounded and the voltage $$\frac{\dot{R}}{KH}$$

appearing at terminal 30 may be multiplied by KH by applying said voltage through conductor 34 to terminal 36 of linear potentiometer 38, the other side of said potentiometer being connected to ground. Movable arm 40 of linear potentiometer 38 is coupled by means of mechanical connection 42 to movable arm 4 of potentiometer 8 and it will be recalled that movable arm 4 is in turn mechanically coupled to altitude hand set 2. Thus, the position of movable arm 40 is a function of the altitude (H). As the voltage impressed across potentiometer 38 is equal to $$\frac{\dot{R}}{KH}$$

it is evident that the voltage developed at movable arm 40 is equal to $$\frac{\dot{R}}{KH}$$

multiplied by KH and thus is proportional to $\dot{R}$.

In view of the foregoing description, it can be seen that when such a computer is associated with a radio object locating apparatus and a bombsight, said computer continuously solves the right triangle shown in Fig. 1. Thus the computer provides as an output a voltage proportional to slant range (r), ground range (R) and ground speed ($\dot{R}$). This information which is in an electrical form may then be applied to additional circuits associated with the actual bombsight and hence the true time for release of the bomb can be determined.

In certain instances it may not be desirable or necessary to utilize all of the above mentioned voltages and in such instances certain components may be dispensed with. For example, if the voltage proportional to ground range (R) is not needed, potentiometer 10 may be eliminated from the circuit, the speed of the motor driving movable arm 16 of potentiometer 12 is still proportional to $$\frac{\dot{R}}{H}$$

and the voltage developed at movable arm 40 of potentiometer 38 is proportional to $\dot{R}$.

Once the target has been passed over, it is obvious that potentiometers 10 and 12 will have to be reset. This may be done manually, or by reversing the field of motor 22, or by many other means which are well known in the art.

The computer has been described in connection with a radio object locating apparatus associated with a bomb sight. It is quite evident, however, that such a computer may be used to solve any right triangle, where the voltage applied across potentiometers 10 and 12 is proportional to one leg of a triangle, and the voltage at arms 14 and 16 are respectively proportional to the other leg of the triangle and the hypotenuse thereof. In such a computer knowledge of any two of the three factors enable determination of the third.

Although there has been described one embodiment of the present invention, it will be manifest to those skilled in the art that other changes and modifications may be made without departing from the spirit and scope of the invention.

What is claimed is:

1. In combination with an airborne radio object locating apparatus wherein the position of a target with respect to the aircraft is shown on an oscilloscope screen and where a marker signal also appears on said oscilloscope screen, a triangle solving computer, said computer including means for generating a voltage proportional to the height of the aircraft above the target, a first potentiometer having a hyperbolic characteristic, a second potentiometer having a linear characteristic, said first potentiometer and said second potentiometer being connected in parallel, means for applying said voltage across said potentiometer combination, a motor, a mechanical connection between said motor and the movable arms of said two potentiometers, means for utilizing the voltage developed at the arm of the hyperbolic potentiometer to position said marker signal, means for adjusting the speed of said motor so that the marker is always superimposed on the target representation appearing on the oscilloscope screen whereby the voltage developed at the arm of said first potentiometer is proportional to the instantaneous slant range of the target and the voltage at the arm of said second potentiometer is proportional to the instantaneous ground range of the target.

2. The apparatus of claim 1 in combination with means associated with said motor for obtaining a voltage proportional to the speed thereof, a third potentiometer, said potentiometer having a linear characteristic, means for applying said voltage across said third potentiometer, means for predetermining the position of the movable arm of said third potentiometer in accordance with the altitude of the aircraft whereby the voltage developed at the arm of said third potentiometer is proportional to the ground speed of the aircraft.

3. A triangle solving computer including means for generating a voltage proportional to a known leg of a right triangle, a first potentiometer having a hyperbolic characteristic, a second potentiometer connected in parallel with said first potentiometer, said second potentiometer having a linear characteristic, means for applying said voltage across said potentiometer combination, a mechanical connection between the arms of said potentiometers, means for obtaining an indication of the value of the voltage at the arm of said first potentiometer and an indication of a known hypotenuse of said triangle, whereby said indications may be compared, means for positioning the arm of said first potentiometer in accordance with said comparison to maintain the voltage developed at the arm of said first potentiometer proportional to said known hypotenuse, whereby the voltage appearing at the arm of said second potentiometer is proportional to the other and unknown leg of said triangle.

4. In a right triangle solving computer for a bombsight adapted to provide a voltage proportional to the slant range r, a potentiometer having a hyperbolic characteristic, means for generating a voltage proportional to the altitude H, means for applying said generated voltage across said potentiometer, a variable speed motor having a shaft, means for mechanically connecting said motor shaft to the movable arm of said potentiometer, means for obtaining an indication of the value of the voltage at said movable arm and an indication of a known slant range r, so that said indications may be compared, means for adjusting the rate of shaft rotation in accordance with said comparison until the voltage developed at said movable arm is proportional to the slant range r, whereby the shaft rotation is proportional to $$\frac{R}{H}$$

R representing the ground range.

5. A triangle solving computer including means for generating a voltage proportional to a known leg of a right triangle, a first potentiometer having a hyperbolic characteristic, a second potentiometer connected in parallel with said first potentiometer, said second potentiometer having a linear characteristic, means for applying said voltage across said potentiometer combination, a mechanical connection between the arms of said potentiometers, means for obtaining an indication of the value of the voltage at the arm of said second potentiometer and an indication of a known other leg of said triangle, whereby said indications may be compared, means for positioning the arm of said second potentiometer in accordance with said comparison to maintain the voltage developed at the arm of said second potentiometer proportional to the other known leg of said triangle, whereby the voltage appearing at the arm of said first potentiometer is proportional to the unknown hypotenuse of said triangle.

6. In a system having three spatial variable coordinates, A, B, and C, characterized by the relationship $C^2 = A^2 + B^2$, an apparatus for producing a voltage proportional to the rate of change of B for any given A, including means for producing a first voltage proportional to any given A; hyperbolic potentiometer means coupled to said first voltage means; means for obtaining an indication of a second voltage at the arm of said hyperbolic means and an indication of a known C, whereby said indications may be compared, variable speed motor means connected to said hyperbolic potentiometer means, for positioning the arm of said hyperbolic potentiometer means in accordance with said comparison to maintain said second voltage proportional to C, whereby the speed of said variable speed motor means will be proportional to the rate of change of B.

7. The system of claim 4 wherein said voltage generating means comprises altitude determining means and a second potentiometer connected between two points having a difference in potential, the movable arm of said first potentiometer being coupled to said altitude determining means and connected to said hyperbolic potentiometer, whereby said first voltage, proportional to H, will be impressed upon said hyperbolic potentiometer.

8. The system of claim 7, further including converting means, linked to said voltage generating means and said variable speed motor shaft, for converting the speed of rotation of said shaft into a third voltage that is proportional to the rate of change of R.

9. The system of claim 8, whereby said converting means comprises tachometer means connected to said variable speed motor and a third potentiometer in series therewith, the movable arm of said second potentiometer being coupled to that of said second potentiometer.

10. The system of claim 4, further including speed control means coupled to said variable speed motor; and wherein said means for obtaining comparison comprises target range indicating means; and marker pulse generator means connected between the arm of said hyperbolic potentiometer means and said target range indicating means; whereby the speed of said motor means may be adjusted by said speed control until a marker pulse is caused to coincide with the target on said target range indicating means.

JOHN W. GRAY.

REFERENCES CITED

The following references are of record in the file of this patent:

UNITED STATES PATENTS

| Number | Name | Date |
| --- | --- | --- |
| 2,070,178 | Pottenger | Feb. 9, 1937 |
| 2,404,337 | Lovell | July 23, 1946 |
| 2,426,658 | Wooldridge | Sept. 2, 1947 |
| 2,444,770 | Flyer | July 6, 1948 |
| 2,466,879 | Doba | Apr. 12, 1949 |
| 2,497,913 | Rines | Feb. 21, 1950 |